Nov. 14, 1967  C. CURTIS  3,352,493
SELF-PROPELLED IRRIGATOR
Filed Oct. 1, 1965  3 Sheets-Sheet 1
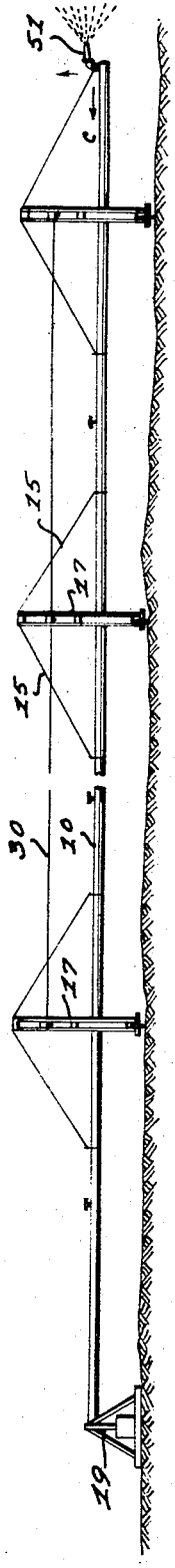
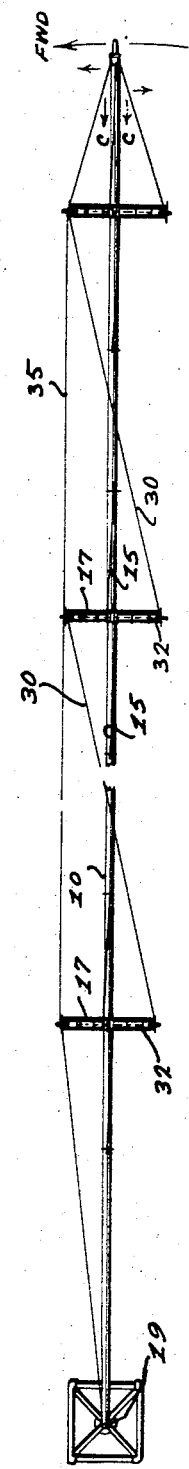
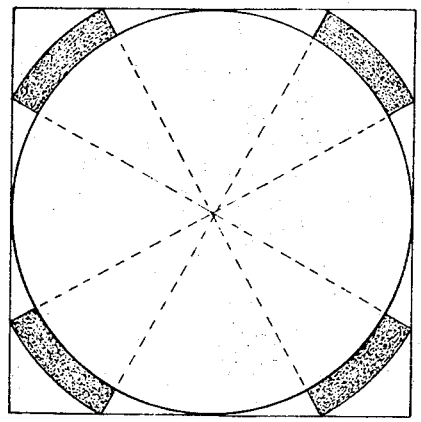
INVENTOR.
CHARLES CURTIS
BY
ATTORNEY

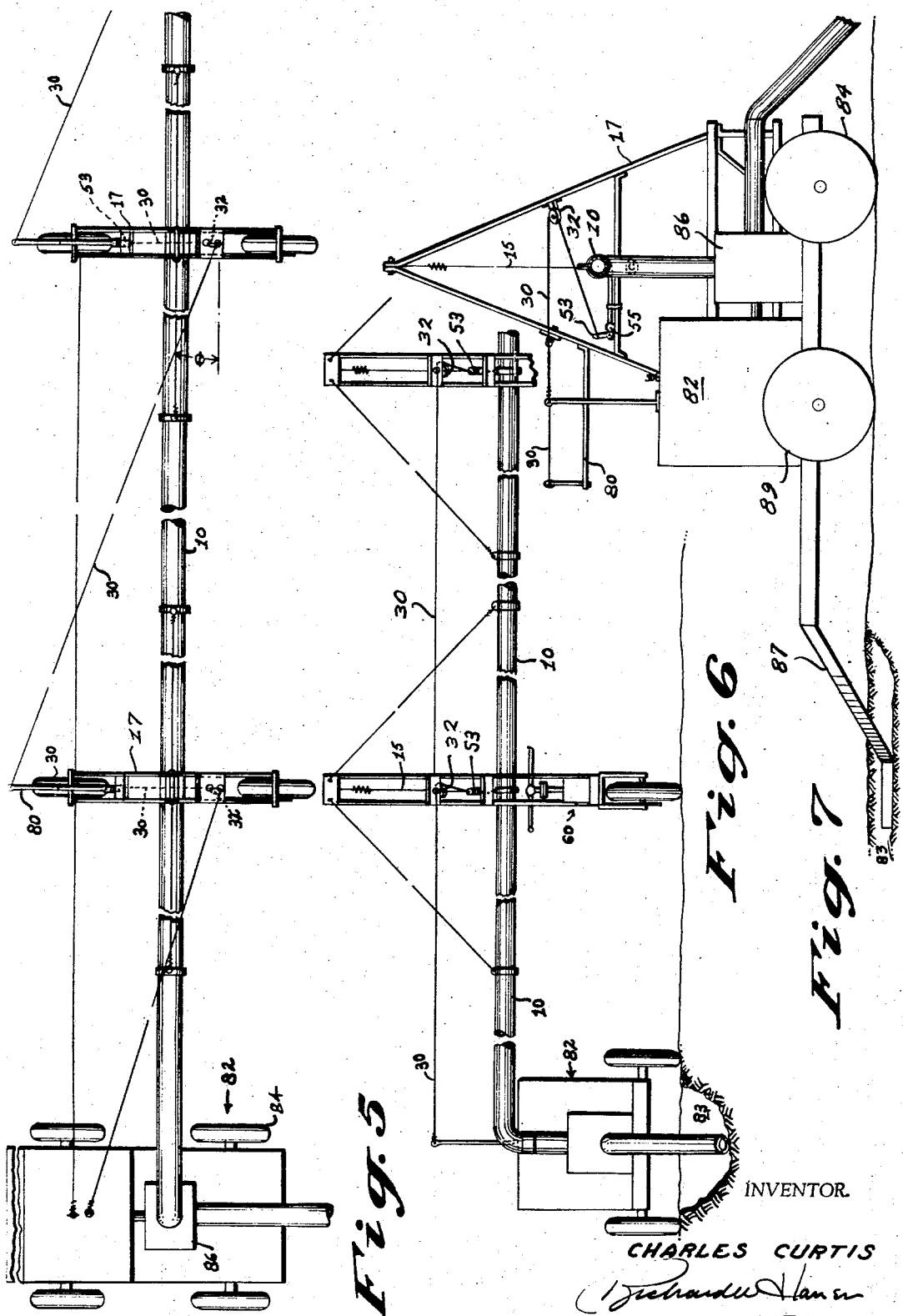

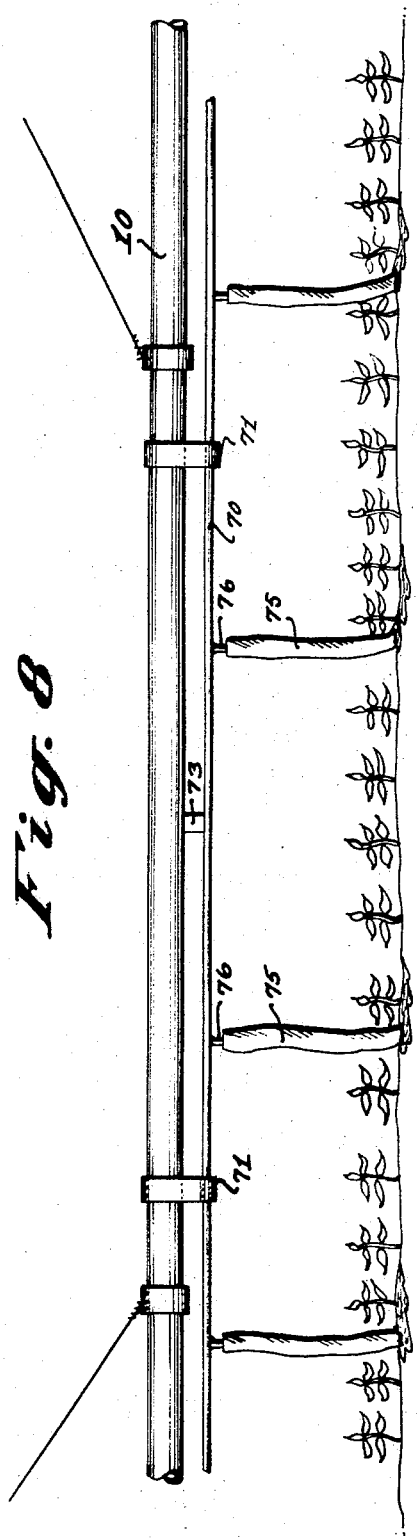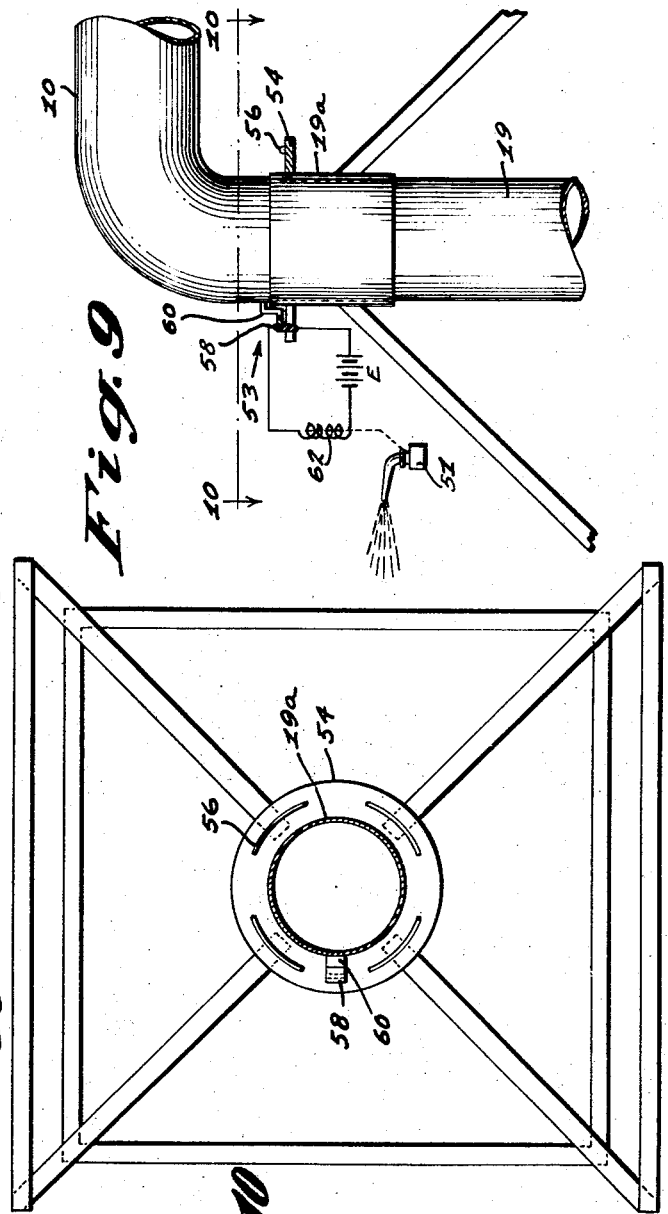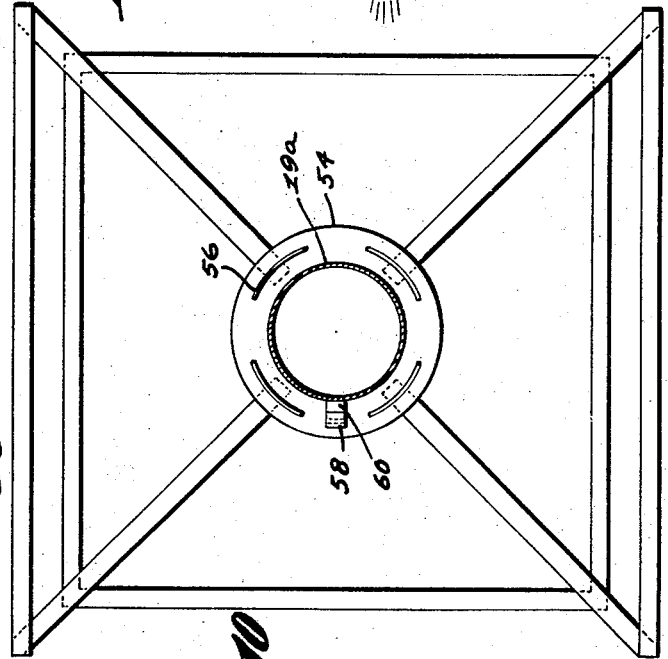

United States Patent Office

3,352,493
Patented Nov. 14, 1967

3,352,493
SELF PROPELLED IRRIGATOR
Charles Curtis, El Paso County, Colo., assignor to
Enresco, Inc., a corporation of Colorado
Filed Oct. 1, 1965, Ser. No. 492,138
4 Claims. (Cl. 239—177)

ABSTRACT OF THE DISCLOSURE

A self propelled circular irrigator having a length of water carrying conduit swivel connected at the end to a water source and supported at intervals by self propelled supports. Each propelling device, except the one mounted on the outermost support, is controlled by a tension member whose one end is secured to the leading edge of the next adjacent outboard support. An end gun sprinkler at the end of the conduit is controlled by an electric solenoid operated by switch means responsive to the angular field position of the conduit.

The present invention relates generally to overhead irrigation apparatus of the type having a movable elongated distributor attached at one of its ends to a source of water supply and which is self propelling over the area to be irrigated. A basically similar structure is disclosed in co-pending United States patent application, Ser. No. 430,857, to which reference is made for a more complete discussion of the system generally.

In order for self propelled irrigation systems of the general type described herein to be practical and economically feasible, several criteria must be met. First, perhaps, the distribution pipe must be long enough to cover a rather substantial area in a circular sweep pattern and must be capable of delivering a sufficient quantity of moisture to the area to accomplish the irrigation. Secondly, the transport system must be such as will adequately support the water carrying pipe over various topographys and carry it in a substantially straight line and do so with a minimum damage to the crop raising potential of the ground over which it travels. Third, the system should be self propelling, that is capable of employing the water pressure available in the main pipe for its driving energy. Of course there are other subsidiary criteria in the design of a successful system, but the advances heretofore made in the prior art have primarily been directed to the more complete satisfaction of these requirements. Because pipe having in the neighborhood of a six inch diameter becomes very flexible and cannot be considered as a rigid beam in the lengths which must be employed (in excess of 1300 feet), the primary problem which has had to be solved is that of propelling each pipe support in such a manner as to maintain the proper alignment of the pipe, that is so that no one of the wheeled pipe supports advances in front of or lags behind the other supports which are spaced along the length of the pipe, regardless of the particular terrain or soil conditions encountered by any support.

To this end the prior art has primarily dedicated itself and has relied for a solution on the concept of drive control through sensing of the horizontal bending of the pipe which occurs when one of the supports advances or lags relative to another support. For correct operation of such a system, the pipe must be fastened and secured to each of its supports in order to provide a point of reference for detecting the bending. This attachment of the pipe to the support, while providing some rigidity to the pipe, also creates certain disadvantages which are set forth in more detail in the co-pending application and which it is one object of the aforesaid invention to overcome by the pendulum suspension of the pipe. Another disadvantage and limitation of the bending detection concept which is not referred to in the co-pending application is that of the need for trussing the pipe. Careful analysis of the statics and dynamics of the pipe and its prior art supports will show that trussing in the horizontal plane is necessary in the center section of each pipe length between two supports to make each center section rigid and thus confine the bending of the pipe to the portion thereof which is near the support which mounts the sensing apparatus; otherwise, the sensitivity of the detection means would be so low as to create problems in alignment. Whether it has been previously recognized and purposefully dealt with or not, the trussing is also necessary to counter and reduce the bending moments which are created in the pipe due to compressive forces acting along the longitudinal axis thereof; and although the attachments between the pipe and the supports reduce the "equivalent length" of the pipe, insofar as it may be said to be a structural column, the bending moments caused by the compression would be very detrimental to maintenance of alignment but for the trussing. Parenthetically, it should be pointed out that the compressive forces C in the pipe are produced by the horizontal components of the tension cables which are attached to the cantilevered outboard section of the pipe, such as the vertical support cable, the lead cable, and the trail cable. Naturally, the need to truss and strengthen the pipe requires additional material and labor and increases the cost and complexity of the device and in general is undesirable. One such device of the prior art is known to employ up to ten thousand feet of trussing cable for a 1320-foot length of pipe.

The foregoing remarks are not meant to imply that systems employing bending detection and having rigid connections between pipe and support are the only ones requiring trussing. The free pendulum suspension of the said co-pending application relies upon the lateral position of the pipe with respect to each of the various supports and because of its necessary freedom from rigid attachment to the support, the equivalent length of the pipe is greatly increased over that of the rigid attachment concepts heretofore described. While the pendulum suspension has significant advantages, the very long equivalent pipe length which it creates brings up a buckling problem which it is necessary to combat with some amount of trussing in the horizontal plane in order to increase the moment of inertia I about the vertical axis of the pipe. The buckling occurs because the compressive forces in the pipe exceed the critical buckling load. By reference to Euler's formula for critical bending loads in a column, to-wit:

$$P_{cr} = \frac{\pi^2 EI}{L^2_{\text{equiv}}}$$

where

E = the modulus of elasticity of the material;
I = the moment of inertia; and
L_{equiv.} = the equivalent length of the column, it is seen that the values of E and I for six-inch diameter water pipe are such that when very long lengths of pipe are considered, the critical bending load becomes small and is in fact exceeded by the compressive forces in the pipe. It is therefore necessary in the embodiment of the co-pending application to employ some trussing to avoid actuation of the control device by the displacement of the pipe due to buckling.

In view of the foregoing, it is most apparent that even though trussing and strengthening seem inevitable, it would be desirable and advantageous to eliminate the need for it. In consideration of this objective, it is the primary purpose of the present invention to provide a control and actuation means which does not depend on nor is responsive to pipe bending, springing or position and which will thereby be forgiving of the bending or buckling which may exist and thereby eliminate the requirement for trussing.

As a collateral objective, the invention has for its purpose the provision of apparatus to simplify and make more effective irrigation devices of the type described.

A further purpose is to provide means for increasing the sensitivity of control of the propelling mechanism.

Other and still further objects, features and advantages of the invention will become apparent as the description proceeds in conjunction with the accompanying drawings in which:

FIGURE 1 is an elevational view of an irrigation system of the present invention.

FIGURE 2 is a planned view of the system shown in the radial configuration wherein the elongated distribution pipe sweeps around a pivot point to describe a circle.

FIGURE 3 is a perspective view of the system of the present invention showing three of the most inboard support frames of the pipe which they carry.

FIGURE 4 is a diagrammatic planned view showing the circular area irrigated by the system with stippled portions extending outwardly from the quadrant of the circle and representing areas irrigated by an auxiliary water gun mounted on the outboard end of the system.

FIGURE 5 is a fragmentary planned view of the system of the present invention in the rectangular area configuration wherein the distributor pipe moves uniformly in a direction transverse to its length.

FIGURE 6 is an elevational view of the system of FIGURE 5.

FIGURE 7 is an end view of the system of FIGURE 5.

FIGURE 8 is a fragmentary elevational view of an embodiment of the system employing soaking socks in lieu of sprinkling nozzles.

FIGURE 9 is an enlarged fragmentary elevational view of the swivel joint of the radial configuration showing a schematic electrical diagram of the circuit used for actuating the water gun.

FIGURE 10 is a top planned view of the swivel joint illustrated in FIGURE 9.

In summary form, the invention can be described as a movable fluid discharge device having an elongated distributor conduit suspended at intervals with flexible hangers attached respectively to spaced apart supporting frames. Each of the frames is equipped with drive means for moving the same and tension means interconnecting two adjacent support frames which is responsive to the movement of the outboard one of the two frames to operate the drive means on the inboard one of the two frames.

Referring now to the drawings for a more detailed description of a preferred form of the invention, the irrigation apparatus is shown in FIGURES 1 and 2 and consists basically of an elongated horizontal distributing pipe 10 supported at intervals along its length by suspension cables 15 hung from the apex of wheeled supporting frames 17. The distributor pipe 10 is connected to a source of water 19 by a swivel connection. In one type of operation, the pipe, acting as a radius, is made to sweep around the point of water supply and to thus describe a generally circular area of irrigated land as shown in FIGURE 3. To provide the motive power for the pipe, each of the supporting frames 17 is equipped with a rotary water motor whose output is operatively connected with a ground contacting drive wheel on the frame 17. Each of the water motors is controlled by means responsive to an incremental advancement of that support frame which is immediately adjacent thereto on the outboard side thereof, with the extreme outboard support frame motor being run continuously at a preset speed. The structure of each of the supporting frames 17 is similar to that described in the co-pending application wherein a rotary water motor 60 is mounted on the frame and connected to a drive wheel 30 through a speed reducing gear box 73 and a drive chain 75. The rotary water motor receives a supply of water under pressure from the main distribution pipe 10 through a valve 55 which is operated by a handle 53 or other convenient means. As previously mentioned, one of the principal improvements made in this invention over prior art structures is the method and means by which the valve 55 is made to function so as to start and stop the water motor on the frame 17. In FIGURE 4, the frame and actuating structure associated therewith are shown. A flexible cable 30 is attached to the valve handle 53 and then trained over a pulley 32 to be directed to a connection at the leading edge of the next adjacent outboard suppor frame 17 as shown in FIGURES 2 and 4. Each of the supporting frames contains a similar arrangement except the furtherest outboard support 17, and the structure of that support mounts a rotary water motor which is set by the valve 53 associated therewith to run continuously. As the extreme outboard tower is propelled by its drive motor and mechanism, it is maintained in a path of circular travel by the lead cable 35 attached to the leading edge of each one of the supports and running parallel with the main pipe 10. The lead cable 35 takes up the tension load associated with the restraint necessary to hold the supports in circular travel around the center pivot, thus avoiding similar loading or bending moments in the distributor pipe. As the outboard tower advances the actuating cable 30 attached to its leading edge is pulled, thus actuating the valve on the next frame inboard. Upon actuation of the valve, the water motor begins to run and advances that frame with a similar actuation of the valve on the next adjacent inboard frame. With each wheeled support frame 17 being likewise activated, it is seen that the plurality of spaced pipe supporting frames 17 will move in substantial radial alignment around the circle. It will also be observed that the distributing pipe 10 is merely carried along by the frames and the motivation of the latter is in no way dependent upon the position of the pipe with respect to the frames or any of them, nor is the bending, springing or stressing of the pipe 10 in any way responsible for actuation of the motor drive mechanism. Since, by this actuation device, the pipe 10 becomes mere cargo and is not functional, except in its water carrying and delivery capacity, it is of no particular significance or importance whether the pipe bends in the horizontal plane or not. In such a free environment, the pendulum suspension disclosed in the co-pending application takes on even greater significance and importance because the free suspension of the pipe by the cables 15 permits the frame to have the freedom of movement necessary to maintain good radial alignment and traction with the ground surface. With horizontal bending now permitted in the system, the designer may employ a pipe having a smaller moment of inertia and less weight. It is not difficult to foresee the advantages of a lightweight pipe when construction and erection are considered in addition to the load carried by each support.

One additional drawback to prior art systems of the type described herein, at least when employed in a circular pattern, is the inability to irrigate the corners of the tract being irrigated. Some attention has been given to this problem in the prior art in the form of proposals to stop the movement of the apparatus at each corner and extend the delivery capability further into the field for short periods of time before continuing the system rotation, however such a method involves certain apparent impracticalities which defeat the advantages. In the present invention, as seen in FIGURES 1, 9 and 10, means are provided to overcome this shortcoming in the form of an electrically actuated water gun 51. At the point of swivel connection between the water supply pipe 19 and the main distributor pipe 10, there is provided an electrical switch 53. Attached around the periphery of the swivel collar 19a is an annular insulating member 54 upon which is mounted an intermittent ring 56 of electrical conducting material. At equispaced positions around the annular member 54, the ring 56 is exposed for contact with an electrically conductive end portion 58 of a wiper arm 60 attached to the rotatable portion 10 of the pipe swivel joint. As seen from the circuit diagram of FIGURE 9, when electrical contact is made between the two switch elements, the circuit is closed, permitting energy from a battery E to energize a solenoid 62 which is mechanically linked to the water gun 51. Upon actuation or deactivation of the solenoid, the gun is turned on and off. By proper design of the electrically conductive ring 56 so that the exposed portion thereof subtends the same angle as that through which it is desired to extend the delivery capabilities, the water gun 51 may be made to turn on and off so as to project water into the corners of the tract, as shown in FIGURE 3. In that figure, the stippled portions represent the additional area covered by the water gun distribution.

Through experience with the prior art devices of the general type described herein, it has been discovered that surface wind conditions sometimes cause undesirable distribution patterns when using the ordinary sprinkling nozzles heretofore referred to. A system of flooding socks, as shown in FIG. 8, may be advantageously applied to the device of the present invention to eliminate such a problem and also to alleviate the rate of evaporation of the water. Inasmuch as the main distributing pipe 10 would be weakened and would gather points of high stress concentration if many apertures were made therein, the present embodiment provides a subsidiary distribution pipe 70 attached by brackets 71 to the main pipe 10. The subsidiary conduit 70 receives a water supply from one or more widely spaced connections 73 with the main pipe and discharges water through a plurality of closely spaced tubular soaking socks 75 depending from downwardly extending outlet pipes 76 connected to the subsidiary pipe 70.

Although the basic concept of employing an ambulating pipe for irrigating a rectangular area, wherein both ends of the pipe are free to move, is not novel to this disclosure, it must be pointed out that with the actuating device disclosed herein, the rectangular pattern now becomes feasible and realistic. As would be expected, a pipe having both of its ends free to move would require a tight and more sensitive control system than one where one end was fixed, as in the circular pattern arrangement. By manipulation of well known geometric relations, it can be seen that by increasing the angle $\theta$ the sensitivity of the control mechanism is also increased. For purposes of this disclosure, sensitivity will be defined as the ratio of support frame advancement to that movement of the actuating cable which is necessary to operate the motor control valve on the next inboard frame. As the angle $\theta$ increases, less forward advancement of one frame is required to actuate the valve on the adjacent frame. To provide the greater angle $\theta$ an extension boom 80, shown in FIGURE 5, is attached to the leading edge of a support frame 17 so as to project outwardly therefrom and secure the fixed end of the cable 30. Naturally this method of increasing control sensitivity is susceptible to the circle pattern design as well as to the mechanism for traversing a path which is normal to the alignment of the pipe 10 and defines a rectangular area.

The arrangement in FIGURES 5, 6 and 7 is one for irrigating a rectangular tract of ground wherein the water supply means takes the form of a wheeled cart 82 which straddles a water ditch 83. The cart 82 may be self propelled by an engine whose output is coupled to the rear wheels 84 by a drive shaft and gear means in a manner well known. The engine may also serve to power a water pump 86 which supplies water to the distributing pipe 10. The cart may be guided by a tongue 87 running in the ditch 83 ahead of the cart and which controls steerable front wheels 89.

This emboiment of the invention can easily be arranged so that the cart, running at a predetermined speed, serves the same function in maintaining alignment of the pipe as does the extreme outboard support frame in the radial configuration.

Having thus described the several useful and novel features of the self propelled irrigator of the present invention in connection with the accompanying drawings, it will be seen that the many worthwhile objectives for which it was designed have been achieved. Although but a few of the several possible embodiments of the invention have been illustrated and described herein, I realize that certain additional modifications may well occur to those skilled in the art within the broad teaching hereof; hence, it is my intention that the scope of protection afforded hereby shall be limited only insofar as said limitations are expressly set forth in the appended claims.

I claim:

1. In a self propelled overhead irrigating device, the combination including;
 a plurality of spaced apart wheeled supports;
 a fluid carrying conduit carried by said supports;
 fluid discharge means connected to said conduit at spaced locations therealong, including,
  a fluid discharge nozzle mounted on the extreme outer end of said conduit, and
  electrical solenoid means for controlling the operation of said nozzle;
 coupling means having two relatively rotatable conduits for pivotally interconnecting the inner end of said conduit to a source of water supply so that the conduit may move as a radius about the water source as a center; and
 electrical means responsive to the radial position of the conduit to operate said solenoid, said means including a switch having at least two contacts mounted respectively on the said two relatively rotatable conduits.

2. In a self propelled overhead irrigating device, the combination including;
 a plurality of spaced apart wheeled supports;
 a fluid carrying conduit carried by said supports;
 fluid discharge means connected to said conduit at spaced locations therealong, including,
  a fluid discharge nozzle mounted on the extreme outer end of said conduit, and
  electrical solenoid means for controlling the operation of said nozzle;
 coupling means having a fixed portion and a rotatable portion for pivotally interconnecting the inner end of said conduit to a source of water supply so that the conduit may move as a radius about the water source as a center;
 switch means having electrical contacts, one of said contacts being mounted on the fixed portion and one being mounted on said rotatable portion of said coupling means, said contacts being adapted to close during at least a portion of the circular movement of the said conduit; and
 connection means, including a source of electrical power, interconnecting said switch contacts and said solenoid, whereby the said fluid discharge nozzle will be turned on during at least a selected portion of the circular travel of the conduit.

3. An overhead irrigating device comprising:
 a plurality of laterally spaced movable supports;
 an elongated fluid carrying conduit carried by said supports and having fluid distributing means at spaced points therealong;
 means connected to one end of said conduit for delivering a supply of water thereto;
 drive means operatively connected to said supports to effect movement thereof;
 means for controlling the drive means, including:
  a valve, and
  a cable member connected at one of its ends directly to said valve and running thence to the adjacent outboard support where the other end of said cable is secured.

4. A self propelled overhead irrigation apparatus which includes a plurality of spaced movable support members, a water supply conduit carried by the supports and having means connected to one end of said conduit for connection to a water source, and drive means operatively connected to each support, the improvement comprising:
- a plurality of control means operatively connected to each of said drive means;
- a tension member directly interconnecting said control means and a point on said irrigation apparatus which is outboard of the respective support.

References Cited

UNITED STATES PATENTS

| | | | |
|---|---|---|---|
| 1,150,144 | 8/1915 | Norton | 239—212 |
| 1,215,081 | 2/1917 | Todd et al. | 239—177 |
| 1,616,769 | 2/1927 | Todd et al. | 239—177 |
| 1,632,353 | 6/1927 | Todd et al. | 238—177 |
| 2,604,359 | 7/1952 | Zybach | 239—177 |
| 2,726,895 | 12/1955 | Behlen | 239—212 |
| 2,893,643 | 7/1959 | Gordon | 239—117 |

EVERETT W. KIRBY, *Primary Examiner.*